US007890742B2

United States Patent
Rostampour

(10) Patent No.: US 7,890,742 B2
(45) Date of Patent: Feb. 15, 2011

(54) AUTOMATICALLY SELECTING FIRMWARE INSTRUCTIONS FOR AN OPERATING SYSTEM

(75) Inventor: Arad Rostampour, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

(21) Appl. No.: 11/789,163

(22) Filed: Apr. 23, 2007

(65) Prior Publication Data
US 2008/0263327 A1 Oct. 23, 2008

(51) Int. Cl.
*G06F 15/177* (2006.01)
(52) U.S. Cl. .............................. 713/1; 713/2
(58) Field of Classification Search .............. 713/1, 713/2
See application file for complete search history.

(56) References Cited

U.S. PATENT DOCUMENTS

| | | | |
|---|---|---|---|
| 7,003,656 B2 | 2/2006 | Chheda et al. | |
| 7,107,330 B1 * | 9/2006 | Hamilton et al. | 709/221 |
| 7,363,484 B2 * | 4/2008 | Davis et al. | 713/100 |
| 7,617,391 B2 * | 11/2009 | Rawe et al. | 713/1 |
| 2006/0053274 A1 * | 3/2006 | Nyuugaku et al. | 713/1 |

* cited by examiner

*Primary Examiner*—Abdelmoniem Elamin

(57) ABSTRACT

Embodiments of the present invention pertain to automatically selecting firmware instructions for an operating system. According to one embodiment, at least a part of a first subset of firmware instructions on a computer system is executed. An automatic determination of whether the first subset of firmware instructions supports an operating system the computer system will execute is made. If the first subset of firmware instructions does not support the operating system, a second subset of firmware instructions that does support the operating system is automatically caused to execute without requiring human intervention. A single firmware includes the first subset and the second subset of firmware instructions for different operating systems.

19 Claims, 4 Drawing Sheets

US 7,890,742 B2

AUTOMATICALLY SELECTING FIRMWARE INSTRUCTIONS FOR AN OPERATING SYSTEM

TECHNICAL FIELD

Embodiments of the present invention relate to firmware. More specifically, embodiments of the present invention relate to automatically selecting firmware instructions for an operating system.

BACKGROUND ART

Typically when a computer system is powered on, firmware associated with the computer system starts to execute. The firmware initializes the computer system, for example, by creating structures that represent various devices the computer system will communicate with and causing the operating system to be loaded, among other things. The firmware passes control to the operating system after it has been loaded. The operating system depends on the firmware to initialize the computer system in a way that enables the operating system to execute successfully. For example, one type of firmware may be used for one type of operating system and another type of firmware has been typically used for another type of operating system. Various firmwares may support different feature sets for different operating systems.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

According to one embodiment, a single firmware is provided that includes instructions, which successfully support multiple operating systems. The execution path of firmware instructions that would be used to successfully support a particular operating system is referred to as a subset of firmware instructions. The execution path of firmware instructions for one operating system may be different than the execution path of firmware instructions used for another operating system. The different execution paths provide according to one embodiment features for hardware or firmware that are not common to all operating systems. When a computer system is first powered on the computer system typically has insufficient information to determine what operating system it will be executing and therefore the computer system has insufficient information to determine what firmware instructions to execute immediately after it has been powered on.

According to one embodiment, a first subset of firmware instructions is executed initially when a computer system is powered on. Once the operating system can be detected, an automatic determination is made as to whether the first subset of firmware instructions that has been executing supports the operating system. If the first subset of firmware instructions does not support the operating system, a second subset of firmware instructions that does support the operating system is automatically selected for execution without requiring human intervention. The computer system can be rebooted to execute the second subset of firmware instructions, as will become more evident.

A Computer System

Figure 1:
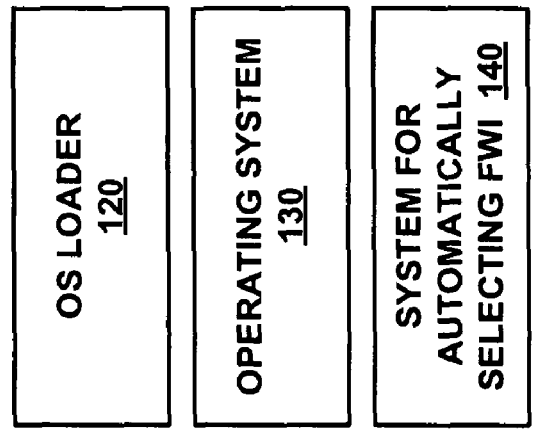
FIG. 1 is a block diagram of a computer system, according to one embodiment.
Figure 1:
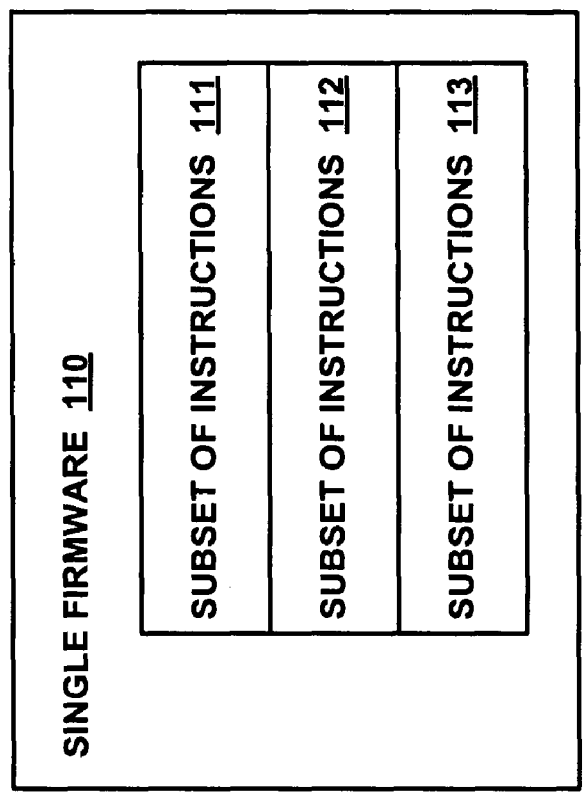

FIG. 1 is a block diagram of a computer system, according to one embodiment. The computer system 100 includes a single firmware 110, an operating system (OS) loader 120, an operating system 130, and a system for automatically selecting firmware instructions (FWI) 140. The single firmware includes three subsets of firmware instructions 111, 112, and 113. Firmware 110 typically is stored in read only memory (ROM). The OS loader 120 and the OS 130 typically are initially stored on memory and loaded into real memory for execution. Examples of memory that the OS loader 120 and the OS 130 may be stored on include but are not limited to disk, ROM, and non-magnetic disk.

When a computer system 100 is powered on, the firmware 110 starts to execute. A first subset of firmware instructions 111 starts to execute. The subset of firmware instructions 111 initializes the computer system 100, for example, by among other things, creating data structures that represent various devices the computer system 100 will interact with. At some point in time, the subset of firmware instructions 111 invokes the OS loader 120 to cause the OS 130 to be loaded into main memory and executed.

As already stated, when the computer system 100 is first powered on, the computer system 100 typically does not have information identifying the operating system 130 that will eventually be executed. The computer system 100 may be in a mode, such as Window™'s mode or Unix mode, which does not correlate to the operating system that will be booted and would eventually execute on the computer system 100. However, the computer system 100 may not know that initially the mode is incorrect. Therefore, according to one embodiment, a first subset of firmware instructions 111 is executed. As instructions are executed, information that identifies the operating system 140 is obtained. If the first subset of firmware instructions 111 does not support the operating system 140, then a second subset of firmware instructions 112 that does support the operating system 130 is automatically selected and the computer system 100 is rebooted with the second subset of firmware instructions 112, as will become more evident.

Information that Identifies the Operation System

Examples of information that can be used to automatically identify an operating system include, but are not limited to, the name of the OS loader, boot options, and heuristics. Frequently OS loaders have names that identify the operating system that they load. Various variables result from boot options that are used for booting a computer system. The variables may be set to values that are unique to a particular operating system. An example of a heuristic includes behavior of instructions associated with the firmware or the OS loader, or a combination of the firmware and the OS loader, which identifies the operating system. For example, a particular function may only be invoked for a particular operating system.

A Single Firmware

According to one embodiment, the single firmware includes instructions for a plurality of operating system that a computer system may execute. Further, the single firmware can include instructions that implement any standard for supporting any operating system. For example, the firmware can include instructions for, among other things, Extended Firmware Interface™ (EFI™), Basic Input/Output System, (BIOS), System Abstract Layer™ (SAL™), PAL, Advanced Configuration and Power Interface™ (ACPI™). The single firmware may include instructions that implement more than one version of a standard. For example, the single firmware may include instructions that support ACPI™ version 1.0 and version 2.0.

The Operating System

The operating system may be any operating system such as Linux, Unix, or Microsoft Windows™. Typically different operating systems have different capabilities and are compatible with different standards. For example, typically Linux and Unix are capable of running on a distributed clock for multiple processor computer systems whereas Windows™ runs on a single clock for multiple processor computer systems. In another example, typically Linux and Unix can be supported with ACPI™ version 2.0, which is backwards compatible with ACPI™ version 1.0, such as older versions of the Window™'s operating system. However, typically Windows™ is supported by ACPI™ version 1.0. Windows™ can not boot and therefore cannot subsequently execute if ACPI™ version 2.0 is used to boot the computer system.

According to one embodiment, the first subset of firmware instructions and the second subset of firmware instructions support operating systems that contrast each other. For example, if the first subset of firmware instructions supports Windows™ then the second subset of firmware instructions supports Unix or Linux. IN another example, if the first subset of firmware instructions supports Linux or Unix then the second subset of firmware instructions supports Windows™.

A Subset of Firmware Instructions

Some prior art systems use a least common denominator of support, which can be used to boot different operating systems, but which also does not provide different feature sets or the best feature sets for the various operating systems. According to one embodiment, different subsets of firmware instructions provide features for hardware or firmware, or a combination thereof, that are not common to all operating systems. Therefore, the firmware 110 firmware is not limited to the least common denominator. The execution path of firmware instructions that would be used to successfully support a particular operating system, according to one embodiment, is referred to as a subset of firmware instructions. The execution path of firmware instructions for one operating system may be different than the execution path of firmware instructions used for another operating system. A subset of firmware instructions is any subset of instructions from the single firmware that can successfully support a particular operating system. The instructions associated with a subset of firmware instructions do not need to be in sequential order.

For example, a particular subset of firmware instructions that can successfully support a UNIX operating system may include some EFI™ instructions and some ACPI™ instructions. In another example, a particular subset of firmware instructions that can successfully support a Windows™ operating system may include a different subset of EFI™ instructions and ACPI™ instructions. In a specific example, a subset of firmware instructions than can successfully support a UNIX or a LINUX operating system may include instructions that implement ACPI™ version 2.0 whereas another subset of firmware instructions that can successfully support a Windows™ operating system may include instructions that implement ACPI™ version 1.0.

Two or more subsets of firmware instructions can share some of the same instructions. For example one subset that supports Unix and another subset that supports Linux may both include instructions for ACPI™ version 2.0. In another example, one subset that supports a Windows™ operating system and another subset that supports a UNIX operating system may both include some of the same EFI™ instructions. Further, according to one embodiment, one subset of firmware instructions supports two different operating systems. For example, one subset may support an operating system A and an operating system B.

According to one embodiment, a subset of firmware instructions includes at least in part data, for example from tables that describe the system. For example, a subset of firmware instructions that reads a value A would be different than if that subset of firmware instructions, or a portion of that subset of firmware instructions, had read a value of B from a table. In a more specific example, a subset of firmware instructions that reads a value indicating the operating system is Window's™ would be different than if it had read a value indicating the operating system is Linux, even if the execution path was the same.

A subset of firmware instructions can include instructions for configuring a computer system's hardware representation. For example, one subset of firmware instructions may include instructions for configuring a distributed clock hardware representation that can be used by Linux or Unix. Another subset of firmware instructions may include instructions for configuring a single clock hardware representation that can be used by Windows™.

Firmware and Hardware Modes

What is commonly known as a "firmware mode," according to one embodiment, correlates to a subset of firmware instructions. For example, a subset of firmware instructions that support ACPI™ version 1.0, which is used by Windows™, correlates to one firmware mode whereas another subset of firmware instructions that support ACPI™ version 2.0, which is used by Linux and Unix, correlates to another firmware mode.

Firmware can be used for setting up the clock that the processors refer to. A "hardware mode," according to another embodiment, correlates to a subset of firmware instructions. For example, a subset of firmware instructions that includes instructions for configuring a distributed clock hardware representation correlates to one firmware mode. However, another subset of firmware instructions that includes instructions for configuring a single clock hardware representation correlates to another hardware mode. Some operating systems are limited to certain hardware modes. For example, some operating systems can only use a single clock hardware representation.

A particular subset of firmware instructions can be correlated to a firmware mode, a hardware mode, or a combination thereof.

Figure 2:
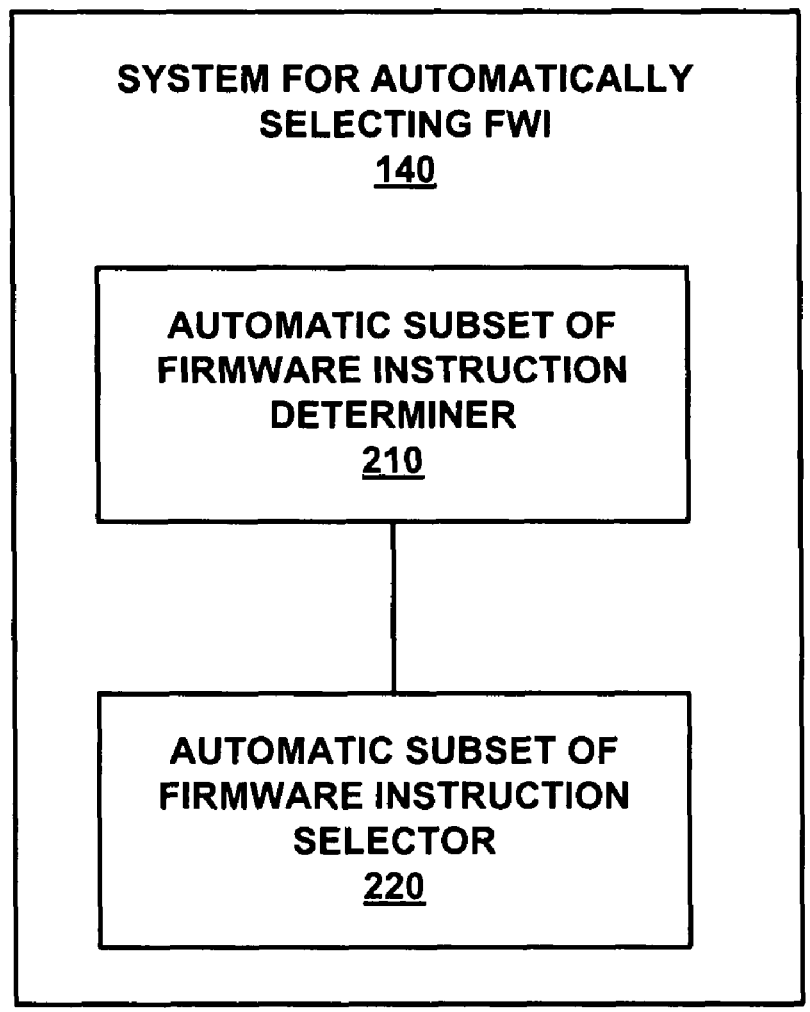
FIG. 2 depicts a block diagram of a system for automatically selecting firmware instructions, according to one embodiment.

A System for Automatically Selecting Firmware Instructions for an Operating System FIG. 2 depicts a block diagram of a system 140 for automatically selecting firmware instructions, according to one embodiment. The blocks depicted in FIG. 2 represent features of the system 140. The blocks that represent features in FIG. 2 can be arranged differently than as illustrated, and can implement additional or fewer features than what are described herein. Further, the features represented by the blocks in FIG. 2 can be combined in various ways. The system 140 can be implemented using software, hardware, firmware, or a combination thereof.

The system 140 for automatically selecting FWI may be initially stored on disk and loaded into main memory for execution or may be on ROM, among other things. The system 140 for automatically selecting FWI may be a part of firmware 110 or may be an add on driver, for example, to extended firmware interface™ (EFI™), as will become more evident. The system 140 for automatically selecting FWI is not limited to EFI™. It can be used in conjunction with other types of firmware, such as BIOS.

The system 140 includes an automatic subset of firmware instruction determiner 210 (referred to hereinafter as the "determiner") and an automatic subset of firmware instruction selector 220 (referred to hereinafter as the "selector"). The determiner 210 is configured for determining whether a first subset of firmware instructions, that has executed at least in part, supports an operating system that a computer system will execute. The selector 220 is configured for causing a second subset of firmware instructions that does support the operating system to be executed, without requiring human intervention, if the first subset of firmware instructions does not support the operating system. According to one embodiment, the term "automatic" implies that human intervention is not required. A single firmware includes the first subset and the second subset of firmware instructions. The determiner 210 is coupled to the selector 220.

Figure 4:
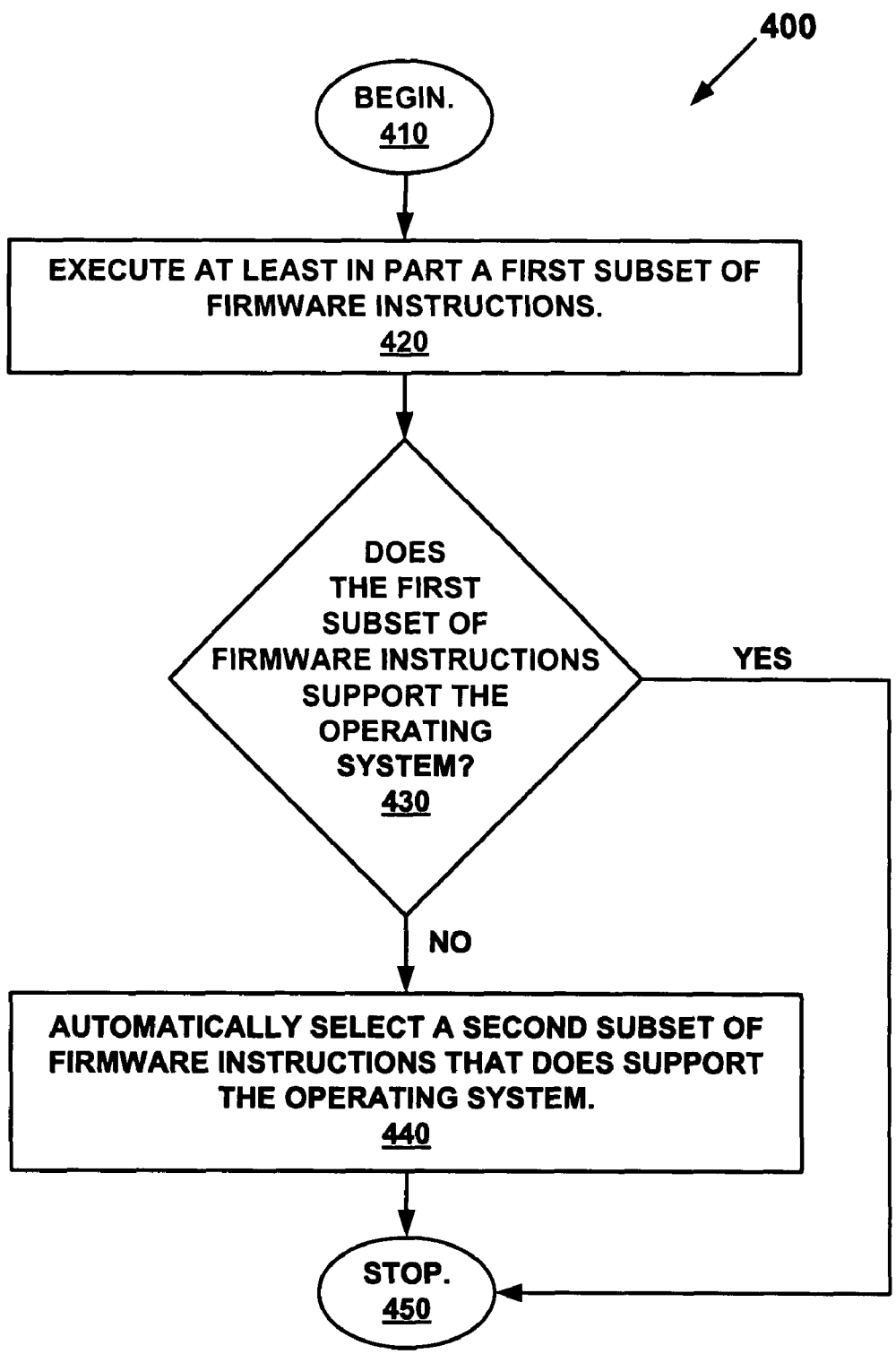
FIG. 4 depicts a flowchart for a method of automatically selecting firmware instructions for an operating system, according to one embodiment.

A Method for Automatically Selecting Firmware Instructions for an Operating System FIG. 4 depicts a flowchart 400 for a method of automatically selecting firmware instructions for an operating system, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

All of, or a portion of, the embodiments described by flowchart 400 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the of the computer system. When executed, the instructions cause the computer system to implement the functionality of the present invention as described below.

Figure 3:
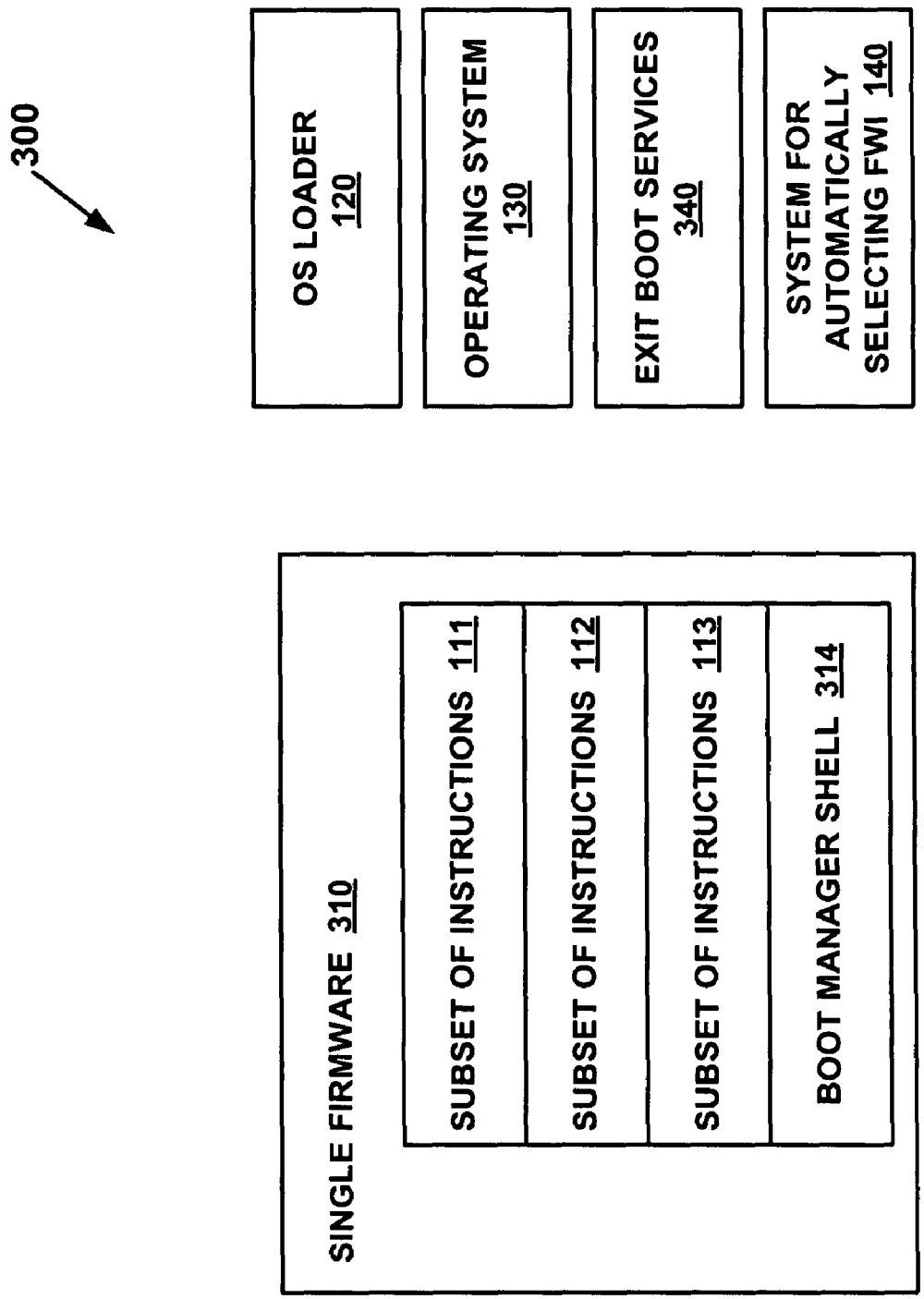
FIG. 3 is a block diagram of a computer system that uses an EFI™ implementation, according to one embodiment.

Flowchart 400 shall be described in the context of FIG. 3. FIG. 3 is a block diagram of a computer system 300 that uses an EFI™ implementation, according to one embodiment. EFI™ can be extended, for example, with add on drivers. As depicted in FIG. 3, the system 140 for automatically selecting FWI is an example of an add on driver to EFI™. Exit Boot Services 350, as will become more evident, provides a call back routine to the firmware. Exit boot services 350, according to one embodiment, is a single service of a broader set of services provided by EFI™. Exit Boot Services 350, according to one embodiment, is a callback for the driver. When the OS loader 120 executes, it will finish with exit boot services 350 which calls back to the firmware and then anything that is registered, such as the driver, would be called back, as will become more evident. According to one embodiment, there is one copy of the boot manager shell 314, which can be a part of any one or more of the subsets of firmware instructions 111, 112, 113.

At 410, the method begins.

At 420, at least in part a first subset of firmware instructions is executed on a computer system. For example, the computer system 300 is powered on. For the sake of illustration, assume that the computer system 300 initially starts to execute a first subset of firmware instructions 111 that supports a Linux OS by providing a distributed clock mode and ACPI™ version 2.0. The boot manager shell 314 starts to execute and an operating system 130 is selected. Assume that a Windows™ operating system is selected. The OS loader 120 proceeds to load the Windows™ operating system into real memory. At the end of the OS loader 120 and before handing control to the operating system 130, according to one embodiment, exit boot services 350 invokes the first subset of firmware instructions 111 with a call back routine. EFI™ invokes add on drivers, such as the system for automatically selecting FWI 140, at the end of EFI™ processing.

At 430, an automatic determination is made as to whether the first subset of firmware instructions supports an operating system the computer system will execute. The system 140 for automatically selecting FWI includes a determiner 210. The determiner 210 can analyze information that has been obtained to determine whether the first subset of firmware instructions 111 supports the Windows™ operating system 130. For example, the determiner 210 can analyze the name of the OS loader 120, boot options, heuristics, such as the behavior of various instructions associated with the instructions of firmware 310 that have been executed and/or the OS loader 120 to identify the operating system 130. In this illustration, the operating system 130 is Windows™ and the determiner 210 automatically determines that the first subset of firmware instructions 111 does not support the Windows™ operating system 130.

At 440, if the first subset of firmware instructions does not support the operating system, a second subset of firmware instructions that does support the operating system is automatically selected for execution. Assume that the second subset of instructions 112 provides instructions for single clock mode and for ACPI™ version 1.0, which supports a Windows™ operating system. Therefore, according to one embodiment, the selector 220 automatically selects the second subset of firmware instructions 112.

At 450, the method stops.

The computer system 300 automatically resets, for example, by rebooting, according to one embodiment. For example, the second subset of firmware instructions 112 is executed, thus, providing support for the Windows™ operating system 130. The boot manger shell 314 is invoked and the OS loader 120 is re-launched. The OS loader 120 invokes the system 140 for automatic selection of FWI. This time the system 140 for automatic selection of FWI determines that the correct subset of firmware instructions 112 has been executed so that the Windows™ operating system 130 can execute successfully.

If it was determined at 430, that the first subset of firmware instructions did support the operating system, then the computer system will not reset (not reboot) and 440 would not be executed.

According to one embodiment, if the first subset of firmware instructions does not support the operating system, the second subset of instructions is selected for execution. According to one embodiment, execution of the second subset of instructions does not require rebooting the computer. For example, processing may switch from a table that supports Unix to a table that supports Windows™ or the setup may be changed or the hardware mode may be changed in a way that does not require a reboot. According to one embodiment, switching tables, changing the setup, or changing the hardware mode results in the second subset of instructions.

Although the above description of flowchart 400 assumed that the first subset of firmware instructions provided for a distributed clock, embodiments are well suited for not switching from a distributed clock to a single clock. For example, if the first subset of firmware instructions provided for a single clock, the second subset of firmware instructions may not include instructions for setting up a single clock.

Although flowchart 400 was described in the context of EFI™, other types of firmware, such as BIOS, could be used. Although an exit boot services call back routine was used for the above illustration, the determination and/or selection could be made any time during the boot process when information that identifies the operating system is available. For example, the determination and/or selection could be made at the time that another firmware service, such as a disk or network read to load the operating system, is invoked during the operating system boot. In another example, the firmware may determine an appropriate behavior for example when starting the loader. In yet another example, the determination and/or selection could be performed when the operating system is selected from the boot menu or the operating system loader is loaded from the boot manager shell.

One way of enabling a computer to boot any type of operating system would be to have the firmware provide only what is common to all of the operating systems. Various embodiments provide for more than one subset of firmware instructions that provide support for different operating systems therefore the single firmware can provide support for more than just the features that are common to various operating systems.

Various embodiments have been described in various combinations. However, any two or more embodiments may be combined. Further, any embodiment may be used separately from other embodiments.

Embodiments of the present invention are thus described. While the present invention has been described in particular embodiments, it should be appreciated that the present invention should not be construed as limited by such embodiments, but rather construed according to the following claims.

What is claimed is:

1. A computer implemented method of automatically selecting firmware instructions for an operating system, the method comprising:
   executing at least in part a first subset of firmware instructions on a computer system;
   automatically determining if the first subset of firmware instructions supports an operating system the computer system will execute; and
   if the first subset of firmware instructions does not support the operating system, automatically causing a second subset of firmware instructions that does support the operating system to be executed without requiring human intervention, wherein a single firmware includes the first subset and the second subset of firmware instructions for different operating systems, at least one subset of said firmware instructions correlates to a firmware mode and a hardware mode, and at least one subset of said firmware instructions supports different operating systems.

2. The computer implemented method as recited by claim 1, wherein a subset of firmware instructions selected from the first subset of firmware instructions and the second subset of firmware instructions includes instructions that implement a standard selected from a group consisting of EFI™, ACPI™, BIOS, SAL™ and PAL.

3. The computer implemented method as recited by claim 1, wherein the first subset of firmware instructions and the second subset of firmware instructions include instructions that implement different versions of ACPI™.

4. The computer implemented method as recited by claim 1, wherein the automatically determining if the first subset of firmware instructions supports then operating system the computer system will execute further comprises:
   using a name of an operating system loader to determine if the first subset of firmware instructions support the operating system.

5. The computer implemented method as recited by claim 1, wherein the automatically determining if the first subset of firmware instructions supports then operating system the computer system will execute further comprises:
   using a boot option to determine if the first subset of firmware instructions support the operating system.

6. The computer implemented method as recited by claim 1, wherein the automatically determining if the first subset of firmware instructions supports then operating system the computer system will execute further comprises:
   using behavior of instructions associated with an entity selected from a group consisting of the first subset of firmware instructions and an operating system loader.

7. A system for automatically selecting firmware instructions for an operating system, the method comprising:
   an automatic subset of firmware instruction determiner configured for determining whether a first subset of firmware instructions, that has executed at least in part, supports an operating system that a computer system will execute; and an automatic subset of firmware instruction selector configured for causing a second subset of firmware instructions that does support the operating system to be executed, without requiring human intervention, if the first subset of firmware instructions does not support the operating system, wherein a single firmware includes the first subset and the second subset of firmware instructions that support different operating systems, at least one subset of said firmware instructions correlates to a firmware mode and a hardware mode, at least one subset of said firmware instructions supports different operating systems and wherein the automatic subset of firmware instruction determiner is coupled to the automatic subset of firmware instruction selector.

8. The system of claim 7, wherein the first subset of firmware instructions and the second subset of firmware instructions include instructions for configuring different hardware representations.

9. The system of claim 8, wherein the first subset of firmware instructions and the second subset of firmware instructions include instructions for configuring a hardware representation selected from a group consisting of a single clock and a distributed clock.

10. The system of claim 7, wherein the first subset of firmware instructions includes instructions that support an operating system selected from a group consisting of a Windows ™ operating system, a Unix operating system, and a Linux operating system and wherein the second subset of firmware instructions includes instructions for an operating system that contrasts an operating system that the first subset of firmware instructions supports.

11. The system of claim 7, wherein the system is a part of the single firmware.

12. The system of claim 7, wherein the system is a part of an add on driver.

13. The system of claim 7, wherein a subset of firmware instructions selected from the first subset of firmware instructions and the second subset of firmware instructions includes instructions that implement a standard selected from a group consisting of EFI™, ACPI™, BIOS, SAL™ and PAL.

14. A computer-usable medium having computer-readable program code embodied therein for causing a computer system to perform a method of automatically selecting firmware instructions for an operating system, the method comprising:
   automatically determining whether a first subset of firmware instructions, that has executed at least in part, supports an operating system that a computer system will execute; and
   automatically selecting a second subset of firmware instructions that does support the operating system for execution, without requiring human intervention, if the first subset of firmware instructions does not support the operating system, wherein a single firmware includes the first subset and the second subset of firmware instructions that support different operating systems, at least one subset of said firmware instructions supports different operating systems and at least one subset of said firmware instructions correlates to a firmware mode and a hardware mode.

15. The computer-usable medium of claim 14, wherein the computer-readable program code embodied therein causes a computer system to perform the method, and wherein a subset of firmware instructions selected from the first subset of firmware instructions and the second subset of firmware instructions includes instructions that implement a standard selected from a group consisting of EFI™, ACPI™, BIOS, SAL™ and PAL.

16. The computer-usable medium of claim 14, wherein the computer-readable program code embodied therein causes a computer system to perform the method, and wherein the method further comprises:
   if the first subset of firmware instructions does not support the operating system, selecting the second subset of instructions for execution, wherein execution of the second subset of instructions is performed with a method selected from a group consisting of rebooting the computer system and not rebooting the computer system.

17. The computer-usable medium of claim 14, wherein the computer-readable program code embodied therein causes a computer system to perform the method, and wherein the automatically determining if the first subset of firmware instructions, that has executed at least in part, supports the operating system that the computer system will execute further comprises:
   using a name of an operating system loader to determine if the first subset of firmware instructions support the operating system.

18. The computer-usable medium of claim 14, wherein the computer-readable program code embodied therein causes a computer system to perform the method, and wherein the automatically determining if the first subset of firmware instructions, that has executed at least in part, supports the operating system that the computer system will execute further comprises:
   using a boot option to determine if the first subset of firmware instructions support the operating system.

19. The computer-usable medium of claim 14, wherein the computer-readable program code embodied therein causes a computer system to perform the method, and wherein the automatically determining if the first subset of firmware instructions, that has executed at least in part, supports the operating system that the computer system will execute further comprises:
   using behavior of instructions associated with an entity selected from a group consisting of the first subset of firmware instructions and an operating system loader.

* * * * *